United States Patent
Veeravalli et al.

(10) Patent No.: US 10,038,605 B2
(45) Date of Patent: Jul. 31, 2018

(54) PROCESSING AND VISUALIZATION OF SINGLE-PAGE APPLICATION PERFORMANCE METRICS

(71) Applicant: LinkedIn Corporation, Mountain View, CA (US)

(72) Inventors: Sreedhar Babu Veeravalli, Santa Clara, CA (US); David Q. He, Cupertino, CA (US); Ruixuan Hou, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

(21) Appl. No.: 15/044,887

(22) Filed: Feb. 16, 2016

(65) Prior Publication Data
US 2017/0237635 A1   Aug. 17, 2017

(51) Int. Cl.
*H04L 12/26* (2006.01)
*H04L 17/30* (2006.01)
*H04L 29/08* (2006.01)
*G06T 11/20* (2006.01)
*G06F 3/0481* (2013.01)
*G06F 17/30* (2006.01)

(52) U.S. Cl.
CPC ........ *H04L 43/045* (2013.01); *G06F 3/04812* (2013.01); *G06F 17/30867* (2013.01); *G06T 11/206* (2013.01); *H04L 67/02* (2013.01)

(58) Field of Classification Search
CPC ....... H04L 43/04; H04L 43/045; H04L 43/08; H04L 67/02; H04L 67/025; H04L 67/10; G06F 3/04812; G06F 17/30867; G06T 11/206

USPC .......................................... 709/224
See application file for complete search history.

(56) References Cited

U.S. PATENT DOCUMENTS

| | | | |
|---|---|---|---|
| 8,412,812 B1* | 4/2013 | Mayers | H04L 67/20 709/203 |
| 9,600,400 B1* | 3/2017 | McDowell | G06F 11/3664 |
| 9,772,923 B2* | 9/2017 | Tellis | G06F 11/3419 |
| 2015/0026239 A1* | 1/2015 | Hofmann | H04L 67/1095 709/203 |

(Continued)

OTHER PUBLICATIONS

Arvind Jain et al., "Resource Timing W3C Working Draft Dec. 16, 2014," Jul. 2015, www.w3.org, https://web.archive.org/web/20150710142914/https://www.w3.org/TR/2014/WD-resource-timing-20141216/.*

(Continued)

*Primary Examiner* — Ruolei Zong
(74) *Attorney, Agent, or Firm* — Park, Vaughan, Fleming & Dowler LLP; Chia-Hsin Suen

(57) ABSTRACT

The disclosed embodiments provide a system for processing data. During operation, the system obtains a set of metrics related to a performance of a single-page application (SPA), wherein the set of metrics includes an initial page load time of the SPA that is calculated from a page load event and a render completion time and a subsequent page load time of the SPA that is calculated from a transition time and the render completion time. Next, the system uses the set of metrics to display a graphical user interface (GUI) comprising a chart of a performance of the SPA. The system then displays, in the chart, a representation of the page load time for the SPA.

16 Claims, 10 Drawing Sheets
(3 of 10 Drawing Sheet(s) Filed in Color)

(56) References Cited

U.S. PATENT DOCUMENTS

| | | | | |
|---|---|---|---|---|
| 2015/0156279 A1* | 6/2015 | Vaswani | ................ | H04L 67/42 |
| | | | | 709/203 |
| 2016/0119199 A1* | 4/2016 | Acharya | ................ | H04L 67/02 |
| | | | | 709/224 |
| 2016/0301584 A1* | 10/2016 | Gehl | ................... | H04L 43/0876 |

OTHER PUBLICATIONS

Zhiheng Wang, "Navigation Timing W3C Recommendation Dec. 17, 2012," Jul. 2015, www.w3.org, https://web.archive.org/web/20150716160932/https://www.w3.org/TR/navigation-timing/.*

* cited by examiner

PROCESSING AND VISUALIZATION OF SINGLE-PAGE APPLICATION PERFORMANCE METRICS

RELATED APPLICATION

The subject matter of this application is related to the subject matter in a co-pending non-provisional application by the same inventors as the instant application and filed on the same day as the instant application, entitled "Real User Monitoring of Single-Page Applications," having Ser. No. 15/044,877, and filing date 16 Feb. 2016.

BACKGROUND

Field

The disclosed embodiments relate to monitoring of web performance. More specifically, the disclosed embodiments relate to processing and visualization of single-page application performance metrics.

Related Art

Web performance is important to the operation and success of many organizations. In particular, a company with an international presence may provide websites, web applications, mobile applications, databases, content, and/or other services or resources through multiple data centers around the globe. An anomaly or failure in a server or data center may disrupt access to a service or a resource, potentially resulting in lost business for the company and/or a reduction in consumer confidence that results in a loss of future business. For example, high latency in loading web pages from the company's website may negatively impact the user experience with the website and deter some users from returning to the website.

However, traditional measurements of web performance may not be applicable to a single-page application (SPA) that loads a single HTML page and dynamically updates the page as input is received from a user. For example, a page load time for a web page is typically calculated based on timing events that are based on the loading of HTML in the web page. On the other hand, a SPA may continue downloading and rendering resources after the loading of HTML for the SPA is complete. Moreover, subsequent views in the SPA may be loaded without retrieving additional HTML, thus interfering with the measurement of load times for the subsequent views using conventional timing events.

Consequently, monitoring and management of web performance may be facilitated by mechanisms for accurately measuring the performance of SPAs.

BRIEF DESCRIPTION OF THE FIGURES

The patent or application file contains at least one drawing executed in color. Copies of this patent or patent application publication with color drawing(s) will be provided by the Office upon request and payment of the necessary fee.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
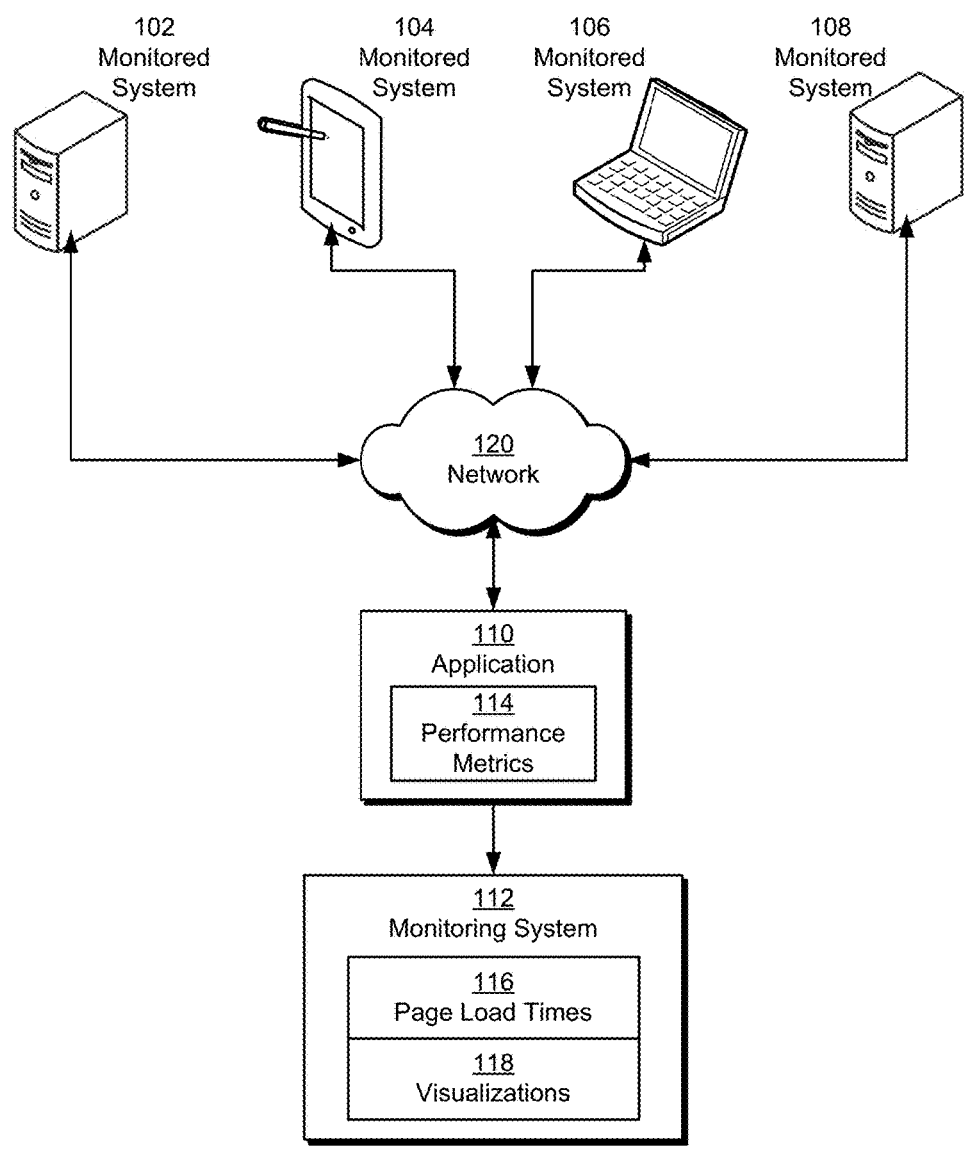
FIG. 1 shows a schematic of a system in accordance with the disclosed embodiments.

The disclosed embodiments provide a method, apparatus, and system for processing data. More specifically, the disclosed embodiments provide a method, apparatus, and system for analyzing time-series data collected from a monitored system. As shown in FIG. 1, a monitoring system 112 may monitor one or more performance metrics 114 related to access to an application 110 by a number of monitored systems 102-108. For example, application 110 may be a web application, a mobile application, a native application, and/or another type of client-server application that is accessed over a network 120. In turn, monitored systems 102-108 may be personal computers (PCs), laptop computers, tablet computers, mobile phones, portable media players, workstations, gaming consoles, and/or other network-enabled computing devices that are capable of executing application 110 in one or more forms.

During access to application 110, monitored systems 102-108 may provide performance metrics 114 to application 110 and/or monitoring system 112 for subsequent analysis by monitoring system 112. For example, a computing device that retrieves one or more pages (e.g., web pages) or screens of application 110 over network 120 may transmit page load times 116, first byte times, content download times, and/or other performance metrics 114 for the pages or screens to application 110. As a result, monitored systems 102-108 may include functionality to perform real user monitoring (RUM) during use of application 110.

In addition, one or more monitored systems 102-108 may be monitored indirectly through performance metrics 114 reported by other monitored systems. For example, the performance of a server and/or data center may be monitored by collecting page load times 116, latencies, and/or other performance metrics 114 from client computer systems that request pages, data, and/or application components from the server and/or data center.

Performance metrics 114 from monitored systems 102-108 may be aggregated by application 110 and/or other monitored systems, such as the data server from which application 110 is served. Performance metrics 114 may then be provided to monitoring system 112 for subsequent analysis and/or display. For example, monitoring system 112 may display values of page load times 116 and/or visualizations 118 associated with page load times 116 in a graphical user interface (GUI).

In one or more embodiments, application 110 includes a single-page application (SPA) that interacts with users of monitored systems 102-108 through a single web page. Because the SPA does not reload the web page or load additional web pages beyond an initial page load event, conventional techniques for collecting page load times 116 and/or other performance metrics 114 from web applications or website may be inapplicable or irrelevant. For example, a monitored system may continue downloading and rendering dynamic data after the initial loading of a HyperText Markup Language (HTML) page before the SPA is complete. In addition, subsequent views in the SPA may be loaded by downloading additional dynamic data without retrieving additional HTML, thus interfering with the accurate measurement of page load times 116 or other performance metrics 114 for the subsequent views.

To improve monitoring and analysis of application 110, monitoring system 112 may include functionality to collect or calculate page load times 116 and/or other performance metrics 114 from the SPA in a way that accurately reflects the performance of the SPA. As described in further detail below, performance metrics 114 may be measured by the SPA, a library or framework used by the SPA, and/or a web browser in which the SPA executes based on events associated with user input, rendering of views or components in the SPA, and/or downloading of resources by the SPA. The SPA and/or monitoring system 112 may then calculate page load times 116 based on the performance metrics instead of conventional performance metrics for non-SPA websites or web applications, thereby enabling the use of meaningful page load times 116 and visualizations 118 by developers and/or administrators of application 110.

Figure 2:
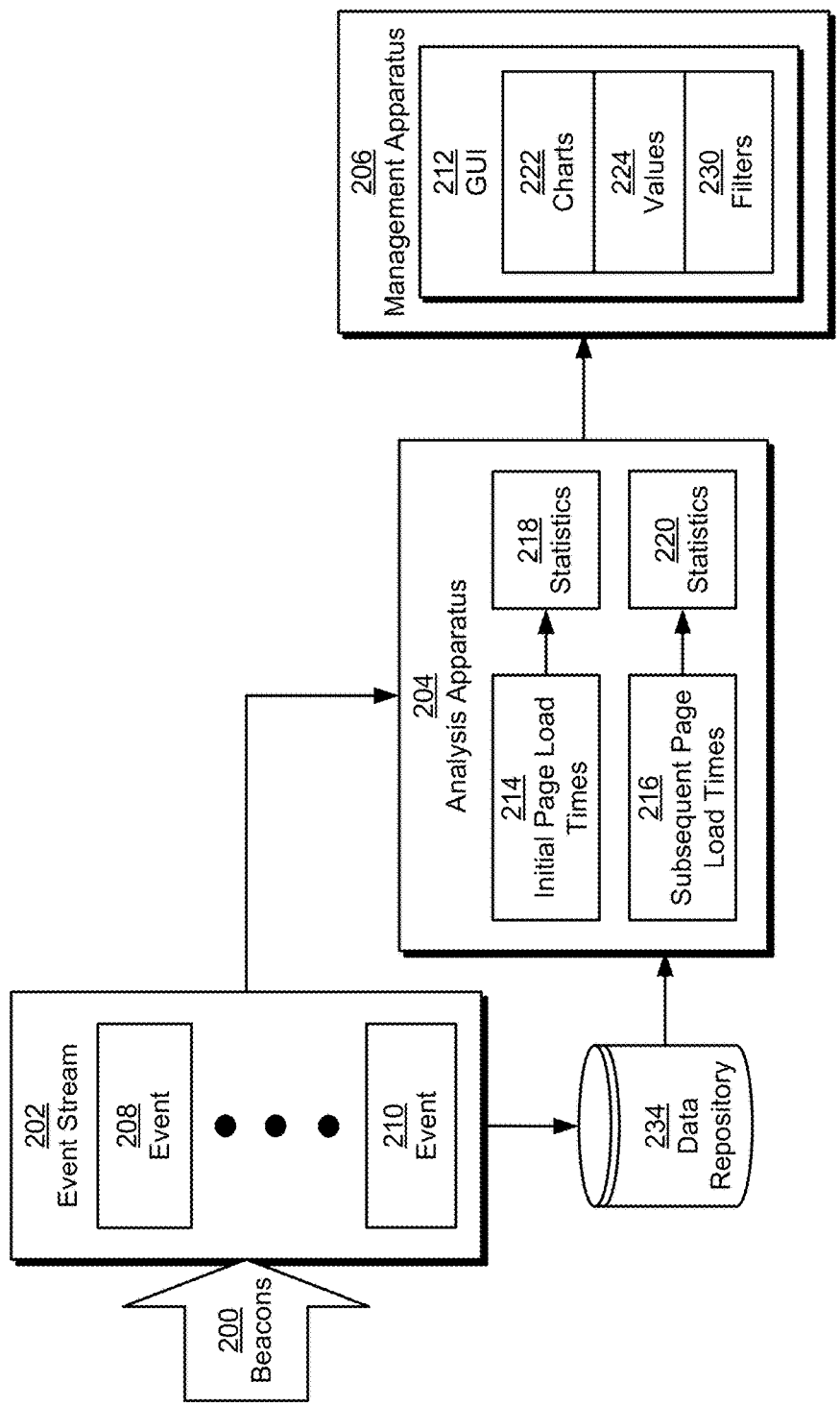
FIG. 2 shows a system for processing data in accordance with the disclosed embodiments.

FIG. 2 shows a system for processing data in accordance with the disclosed embodiments. More specifically, FIG. 2 shows a monitoring system that collects and analyzes performance metrics from a number of monitored systems, such as monitoring system 112 of FIG. 1. As shown in FIG. 2, the monitoring system includes an analysis apparatus 204 and a management apparatus 206. Each of these components is described in further detail below.

Analysis apparatus 204 may obtain a series of events 208-210 from an event stream 202 containing records of page views, clicks, and/or other activity collected from the monitored systems; performance metrics (e.g., performance metrics 114 of FIG. 1) associated with the activity; and/or other time-series data from the monitored systems. Events 208-210 in event stream 202 may be generated from beacons 200 containing the time-series event data from the monitored systems. For example, web browsers on the monitored systems may transmit beacons 200 to a server according to timeouts, user activity, browser activity, and/or application activity on the monitored systems. The server may convert the beacons into events 208-210 and place the events in event stream 202.

In one or more embodiments, beacons 200 are populated with data and transmitted from the monitored systems using web application frameworks and/or application-programming interfaces (APIs) available to SPAs on the monitored systems. For example, a beacon containing RUM data for a SPA may be generated using a RUM library, a navigation timing API provided by a web browser, a resource timing API provided by the web browser, and/or a model-view-controller (MVC) framework used by the SPA.

After events 208-210 are generated, the events may be stored in a data repository 234, such as a relational database, distributed filesystem, and/or other storage mechanism, for subsequent retrieval and use by analysis apparatus 204 in "offline" or batch processing of the corresponding data. Some or all of the events may also be transmitted directly to an "online" instance of analysis apparatus 204 for real-time or near-real-time processing.

Next, analysis apparatus 204 may use data in events 208-210 to calculate initial page load times 214 and subsequent page load times 216 for SPAs executing on the monitored systems. Initial page load times 214 may be measurements of time required to initially load and render HTML, scripts, components, and/or resources in the SPAs. Subsequent page load times 216 may be measurements of time required to load and render subsequent views in the SPAs, which may lack additional HTML but contain additional scripts, components and/or resources that are displayed within the views and/or used to interact with users of the SPA. Calculation of initial page load times for SPAs is described in further detail below with respect to FIG. 3A, and calculation of subsequent page load times for SPAs is described in further detail below with respect to FIG. 3B.

Analysis apparatus 204 may also calculate a number of statistics 218-220 from initial page load times 214 and subsequent page load times 216. For example, analysis apparatus 204 may calculate, for subsets of page load times 214 and subsequent page load times 216 that span different time intervals (e.g., time or date ranges), a mean, median, quantile, variance, count, and/or other summary statistic of the corresponding values.

Analysis apparatus 204 may also aggregate statistics 218-220 along a number of additional dimensions associated with initial page load times 214 and subsequent page load times 216. For example, each page load time may be calculated from data in a beacon that contains a set of performance metrics related to the corresponding page load. To facilitate subsequent analysis of the page load time and/or performance metrics, the performance metrics may be accompanied by dimensions such as a browser type, operating system, location, and/or device type of the corresponding monitored system; an autonomous system number (ASN), connection type, network carrier, and/or network quality of the network to which the monitored system is connected; and/or a page identifier, version, or environment of a SPA executing on the monitored system. The dimensions may be included in the beacon, transmitted with the beacon, and/or obtained separately from the beacon.

To aggregate statistics 218-220 along the additional dimensions, analysis apparatus 204 may run a number of parallel tasks, each of which generates statistics 218-220 according to a given subset of dimensions. For example, analysis apparatus 204 may execute a first task to calculate percentiles of initial page load times 214 and subsequent page load times 216 by page identifier and location, and a second task to calculate the percentiles by browser type and operating system.

After a given task has finished calculating the statistics along the corresponding dimensions, the task may recalculate the statistics along the same dimensions and one or more additional dimensions. Continuing with the above example, the first task may recalculate the percentiles by page identifier, location, and browser type, and the second task may recalculate the percentiles by browser type, operating system, and location. The tasks may continue generating the statistics along different subsets of dimensions until the statistics are available for the most common dimensional combinations and/or until all combinations of up to a certain number of dimensions have been considered. By dividing the calculation and recalculation of statistics 218-220 among multiple concurrent tasks, analysis apparatus 204 may generate the statistics in a timely manner in both online and offline processing contexts.

After initial page load times 214, subsequent page load times 216, statistics 218-220, and/or other performance metrics are generated by analysis apparatus 204, management apparatus 206 may output one or more representations of the performance data in a graphical user interface (GUI) 212. First, management apparatus 206 may display one or more charts 222 in GUI 212. Each chart may include representations of the performance metrics for one or more SPAs, as described in further detail below with respect to FIGS. 4A-4D. For example, charts 222 may include line charts, bar charts, waterfall charts, and/or scatter plots of the performance metrics and/or statistics 218-220 along different dimensions or combinations of dimensions.

Second, management apparatus 206 may display one or more values 224 associated with the performance metrics in GUI 212. For example, management apparatus 206 may display a list, table, overlay, and/or other user-interface element containing the performance metrics and associated dimensions. The displayed data may further be based on a position of a cursor in GUI 212, as described below with respect to FIGS. 4A-4B.

To facilitate analysis of charts 222 and/or values 224, management apparatus 206 may provide one or more filters 230. For example, management apparatus 206 may display filters 230 for various dimensions along which statistics 218-220 are generated and/or the page load times are grouped. After one or more filters 230 are selected by a user interacting with GUI 212, management apparatus 206 may use filters 230 to update charts 222 and/or values 224. Consequently, the system of FIG. 2 may improve the monitoring and management of SPA performance by generating and displaying page load times and statistics that are relevant to the SPAs and/or the execution contexts of the SPAs.

Those skilled in the art will appreciate that the system of FIG. 2 may be implemented in a variety of ways. As mentioned above, an "online" instance of analysis apparatus 204 may perform real-time or near-real-time processing of events 208-210, and an "offline" instance of analysis apparatus 204 may perform batch or offline processing of the events. A portion of analysis apparatus 204 may also execute in the monitored systems to generate page load times (e.g., initial page load times 214, subsequent page load times 216) and/or statistics (e.g., statistics 218-220) that are included in beacons 200, in lieu of or in addition to calculating the page load times and/or statistics after the beacons are received from the monitored systems.

Similarly, analysis apparatus 204, management apparatus 206, GUI 212, and/or data repository 234 may be provided by a single physical machine, multiple computer systems, one or more virtual machines, a grid, a cluster, one or more databases, one or more filesystems, and/or a cloud computing system. Analysis apparatus 204, GUI 212, and management apparatus 206 may additionally be implemented together and/or separately by one or more hardware and/or software components and/or layers.

Figure 3A:
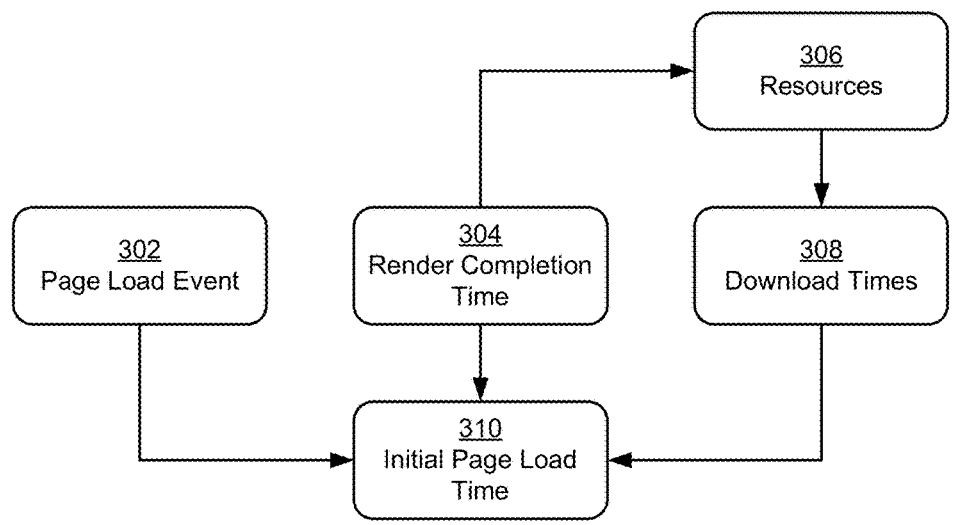
FIG. 3A shows the calculation of an initial page load time for a single-page application (SPA) in accordance with the disclosed embodiments.

FIG. 3A shows the calculation of an initial page load time 310 for a SPA in accordance with the disclosed embodiments. As shown in FIG. 3A, initial page load time 310 may be calculated from a page load event 302, a render completion time 304, and/or one or more download times 308 associated with initial loading of the SPA in a web browser.

Page load event 302 may represent the time at which loading of the SPA is initiated. Page load event 302 may be obtained from a navigation timing API provided by a web browser used to load the SPA. For example, page load event 302 may be obtained from a "navigationStart" attribute of a standardized "PerformanceTiming" interface supported by the web browser. A value for page load event 302 may be obtained through the initialization of a RUM library by the SPA and/or the inclusion of an MVC plug-in that automatically handles calls to the RUM library on behalf of a SPA.

Render completion time 304 may represent the time at which downloading and rendering of the page representing the SPA is complete. Render completion time 304 may be indicated by a "render complete" call to the RUM library by the SPA and/or a plug-in used by the SPA. When the call is made, a field representing render completion time 304 in the RUM library may be set to the current time.

On the other hand, the calculation of initial page load time 310 from page load event 302 and render completion time 304 may be inaccurate if resources 306 such as images, scripts, and/or text that are requested during loading of the SPA continue to be downloaded and rendered after render completion time 304. To account for continued downloading of resources 306 after render completion time 304, download times 308 of resources 306 may be included in the calculation of initial page load time 310. For example, resources 306 may include images that are included in a Document Object Model (DOM) of the SPA at render completion time 304. Resources 306 may also be filtered to include images that are visible in the viewport of the SPA during initial loading of the SPA to accurately reflect the user's page-viewing experience. A RUM library and/or plug-in may obtain download times 308 of resources 306 using the "responseEnd" attribute of a standardized "PerformanceResourceTiming" interface supported by the web browser. The latest resource download time in all resource download times 308 may be then identified, and initial page load time 310 may be calculated by subtracting page load event 302 from the identified value.

While initial page load time 310 is calculated from page load event 302, render completion time 304, and/or resource download times 308, other performance metrics associated with the SPA may continue to be collected. Page load event 302, render completion time 304, download times 308, and/or the other performance metrics may then be included in a beacon that is transmitted to a monitoring system (e.g., monitoring system 112 of FIG. 1) for storage, processing, and/or output. For example, a web browser may populate the beacon with page load event 302, render completion time 304, download times 308, other "NavigationTiming" and "ResourceTiming" attributes such as DNS lookup time and TCP connection time, an identifier for an "initial page" of the SPA, and/or render start times and render completion times of individual components identified within an MVC framework used to implement the SPA. The beacon may then be transmitted to the monitoring system after a prespecified period (e.g., a number of seconds) after render completion time 304 has passed to allow initial page load time 310 to be calculated from resource download times 308 that occur after render completion time 304. Alternatively, transmission of the beacon may be triggered by an event representing the loading of a subsequent view in the SPA, as described in further detail below with respect to FIG. 3B.

Figure 3B:
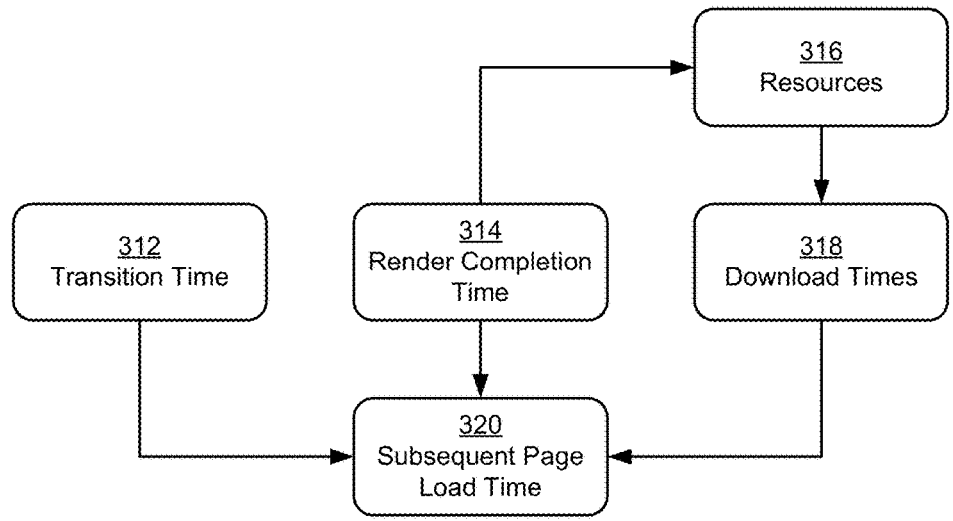
FIG. 3B shows the calculation of a subsequent page load time for a SPA in accordance with the disclosed embodiments.

FIG. 3B shows the calculation of a subsequent page load time 320 for a SPA in accordance with the disclosed embodiments. Unlike initial page load time 310, subsequent page load time 320 may represent the time required to load a subsequent "view" in the SPA. For example, subsequent page load time 320 may represent the time elapsed between user input (e.g., a click, a swipe, a keyboard shortcut, and/or a gesture) that triggers a change in the appearance of the SPA and the completion of loading and rendering of resources 316 used to change the appearance.

The beginning of subsequent page load time 320 may be marked by a transition time 312 that represents a transition to the subsequent view from a previous view, which may include the SPA as initially loaded and/or another view in the SPA that is loaded after the initial page load. Transition time 312 may be indicated by a call to a RUM API used by the SPA. For example, a developer of the SPA may include a "transition start" call to the API at a point represented by the initial loading of the subsequent view, which is triggered by clicking a hyperlink in the SPA, scrolling within the SPA, and/or other user input or gestures. The call may cause a beacon containing timing information for a previously loaded page or view to be transmitted to the monitoring system, if the beacon has not already been transmitted after a timeout after loading of the previous page or view has lapsed. Fields in the beacon may then be reset to null values, and a field in the beacon that represents transition time 312 may be set to the current time.

As an alternative or addition to an API call within SPA, transition time 312 may be specified by an MVC framework plug-in that performs instrumentation of the SPA. The plug-in may include a service that interfaces with the API and a number of components that inject calls to the API at points in the SPA that match predefined events, such as events associated with loading of subsequent views and/or components in the SPA. Continuing with the above example, the plug-in may mark transition time 312 by injecting the corresponding "transition start" call at a point in the SPA that represents a transition between two predefined states of the SPA. The plug-in may also identify the state representing the subsequent view after transition time 312 is marked. Continuing with the previous example, the plug-in may inject an additional "set page key" call after the "transition start" call to add a "page key" that uniquely identifies the subsequent view to the beacon.

As with initial page load time 310, the end of subsequent page load time 320 may be marked by a render completion time 314 and/or download times 318 of one or more resources 316 loaded within the view. Like transition time 312, render completion time 314 may be identified using an API call that is provided by a developer of the SPA and/or an instrumentation mechanism. For example, render completion time 314 may be marked by a "render complete" call that is included at a point that is specified by the developer and/or that matches a predefined event identified by the instrumentation mechanism.

Additional performance metrics may be collected between transition time 312 and render completion time 314. For example, the load times of individual components (e.g., modules) within the view may be tracked by making "render start" to the RUM API as loading of the components is initiated and "render complete" calls to the API as loading of the components is completed. Each call may include one or more parameters that uniquely identify the corresponding component to associate the corresponding render start or render completion time with the component.

After render completion time 314 has passed, download times 318 of resources 316 associated with the subsequent view may be obtained using a "PerformanceResourceTiming" interface with the web browser, as discussed above. Subsequent page load time 320 may then be calculated by subtracting transition time 312 from render completion time 314 and/or the latest download time in download times 318, whichever occurs later. For example, subsequent page load time 320 may be calculated by the RUM API and included in a beacon that is sent to the monitoring system after a predefined timeout and/or when a transition to a new view is detected in the SPA. Alternatively, subsequent page load time 320 may be calculated from information in the beacon during real-time, near-real-time, or batch processing of beacon data by the monitoring system.

Figure 4A:
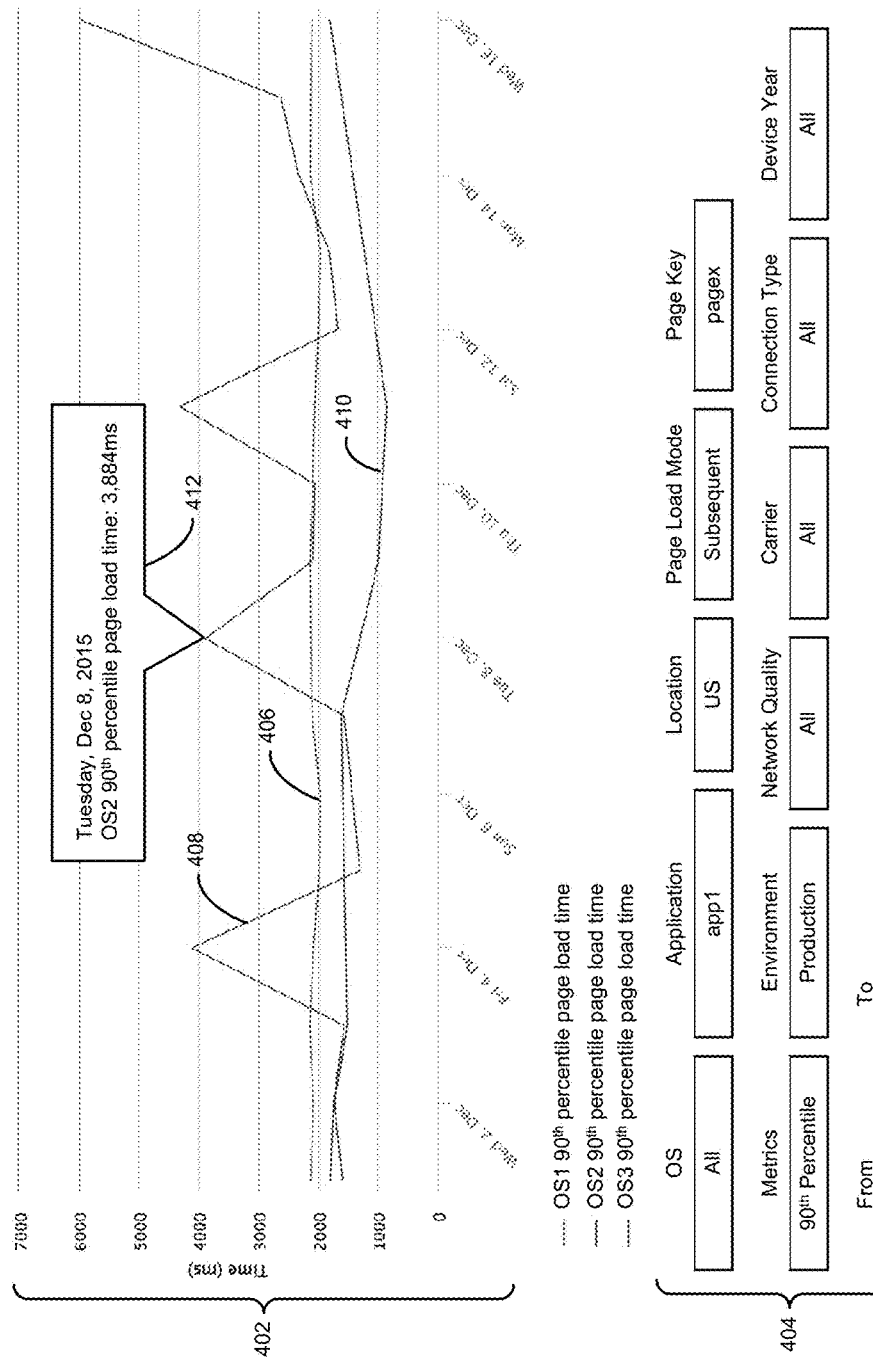
FIG. 4A shows an exemplary screenshot in accordance with the disclosed embodiments.

FIG. 4A shows an exemplary screenshot in accordance with the disclosed embodiments. More specifically, FIG. 4A shows a screenshot of a GUI, such as GUI 212 of FIG. 2. As mentioned above, the GUI may be used to display representations of performance metrics for SPAs. In turn, the displayed information may improve the monitoring, management, and assessment of the performance of the SPAs across different execution contexts and/or conditions.

As shown in FIG. 4A, the GUI includes a chart 402 of performance data for a SPA. Chart 402 may be a line chart containing a number of lines 406-410, each representing a different performance metric for the SPA over time. For example, lines 406-410 may track the $90^{th}$ percentile of a page load time (in ms) of a given page or view in the SPA for three different operating systems in which the SPA executes. As a result, lines 406-410 may be used to identify changes in the performance of the SPA in a given operating system over time, as well as differences in the performance of the SPA across the operating systems.

Data in chart 402 may be produced by aggregating values of page load time for the page or view into a number of statistics. For example, points in lines 406-410 may represent $90^{th}$ percentile values of page load times for the corresponding operating systems. The $90^{th}$ percentile values may be calculated on a daily basis from the page load times, which in turn may be calculated from beacons containing performance metrics (e.g., page load events, transition times, render completion times, resource download times, etc.) that are transmitted by instances of the SPA executing on different computing devices.

Chart 402 may also be updated based on the position of a cursor in the GUI. In particular, chart 402 includes a user-interface element 412 that is adjacent to a point in line 408. User-interface element 412 may be displayed when the cursor is positioned over the corresponding point. Data in user-interface element 412 may include a date (i.e., "Tuesday, Dec. 8, 2015) represented by the point, as well as a description of data represented by the point (i.e., "OS2 $90^{th}$ percentile page load time: 3,884 ms"). As the cursor is moved over other points in chart 402, the position of user-interface element 412 may shift to be adjacent to the point over which the cursor is currently positioned, and values in user-interface element 412 may be updated to reflect data associated with the corresponding point. Thus, user-interface element 412 may allow a user to obtain specific values related to information in chart 402 and perform detailed analysis and assessment of the performance of the SPA using the values.

Different views of data in chart 402 may be generated by applying one or more filters 404 to the data. Filters 404 may include an operating system (i.e., "OS"), application, location (e.g., continent, country, region, state, city, etc.), page load mode (e.g., initial page load or subsequent view load), and/or page key (i.e., unique identifier for a page or view). Filters 404 may also include one or more metrics (e.g., page load times, percentiles, statistics, traffic counts, other performance metrics), an environment (e.g., development, testing, production, etc.), a network quality (e.g., poor, average, good, excellent, unknown), a network carrier (e.g., cellular network carrier), connection type (e.g., 2G, 3G, 4G, LTE, WiFi, Ethernet, etc.), and/or a device year. Filters 404 may further include a date range (i.e., Nov. 30, 2015 to Dec. 16, 2015) associated with the values displayed in chart 402.

After a given set of filters 404 is specified using the corresponding user-interface elements, chart 402 may be updated to contain data that matches the filters. For example, chart 402 may be updated with page load times or statistics that reflect different percentiles, operating systems, applications, pages, views, locations, browsers, date or time ranges, and/or network conditions. To expedite the updating of chart 402 based on filters 404, one or more predefined subsets of statistics may be calculated based on the most common and/or popular combinations of dimensions represented by filters 404. Filters 404 specified in the GUI may then be matched to the predefined subsets, and the predefined subsets may be retrieved and used to populate chart 402.

The scale and/or appearance of chart 402 may additionally be modified to show other representations of page load times, performance metrics, and/or the associated statistics. For example, points in lines 406-410 may reflect the aggregation of page load times or other performance metrics along hourly, weekly, five-minute, and/or other intervals. In another example, the x-axis of chart 402 may span a week, and one or more lines in chart 402 may reflect performance data from the most recent week. Additional lines that reflect performance data from one or more preceding weeks may also be displayed in chart 402 to enable comparison of weekly and/or seasonal changes in the performance data.

Chart 402 may further display one or more lines that reflect weekly differences in the performance data, which may represent data that is produced by subtracting the performance data from the most recent week from the performance data from the preceding week.

Figure 4B:
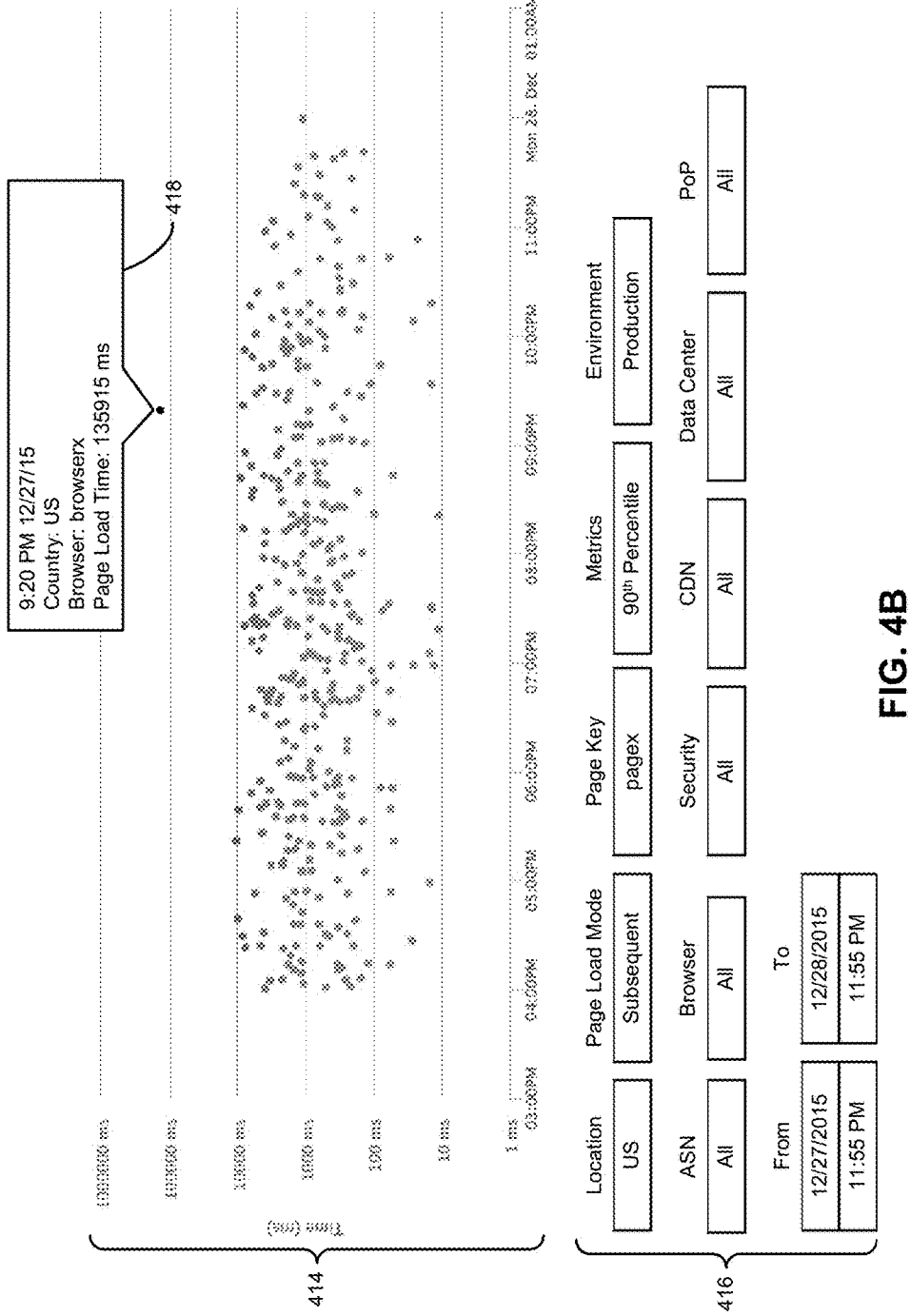
FIG. 4B shows an exemplary screenshot in accordance with the disclosed embodiments.

FIG. 4B shows an exemplary screenshot in accordance with the disclosed embodiments. Like FIG. 4A, FIG. 4B shows a GUI, such as GUI 212 of FIG. 2. Unlike the GUI of FIG. 4A, the GUI of FIG. 4B includes a chart 414 that is shown as a scatter plot of individual page load times for a SPA over time. The y-axis of chart 414 may represent the page load times in ms, and the x-axis of chart may represent a range of times at which the page load times were observed.

Each point in the scatter plot may represent a page load time for a page or view in the SPA, with the horizontal position of the point reflecting the time at which the page or view was loaded and the vertical position of the point reflecting the value of the page load time. The point may be color-coded so that a representation of a lower page load time is colored more lightly than a representation of a higher page load time. Alternatively, the coloring, sizing, shape, shading, and/or other visual attributes of points in the scatter plot may reflect other metrics or dimensions associated with the page load times. For example, the appearance of each point may identify the conformity to or violation of a service level agreement (SLA) by the corresponding page load time and/or the location or type of a computing device from which the page load time was obtained. As a result, the scatter plot may be used to identify patterns, trends, or common ranges of values of page load times for the SPA, as well as changes to the values over time or outliers in the values.

As with filters 404 of FIG. 4A, a number of filters 416 may be used to generate different views of data in chart 414. Filters 416 may be used to specify a location, page load mode, page key, one or more metrics, and/or an environment associated with page load times in chart 414. Filters 416 may also be used to select an Autonomous System Number (ASN), browser, type of network security (e.g., HTTP, HTTPS, none, etc.), content delivery network (CDN), data center, and/or point-of-presence (PoP) associated with one or more networks over which the SPA is loaded. Filters 416 may additionally be used to indicate a date or time range (i.e., 11:55 PM Dec. 27, 2015 to 11:55 PM Dec. 28, 2015) associated with the x-axis of chart 414. After a set of filters 416 is specified using the corresponding user-interface elements, chart 414 may be updated to display data that matches the filters.

Chart 414 may additionally be updated based on the position of a cursor in the GUI. As shown in FIG. 4B, chart 414 includes a user-interface element 418 that is adjacent to a point in the scatter plot. User-interface element 418 may be displayed when the cursor is positioned over the point. Data in user-interface element 418 may include a date and time (i.e., "9:20 PM 12/27/15"), location (i.e., "US"), browser (i.e., "browserx"), and page load time (i.e., "135915 ms") of the page load represented by the point. As the cursor is moved over other points in chart 414, the position of user-interface element 418 may shift to be adjacent to the point over which the cursor is currently positioned, and values in user-interface element 418 may be updated to reflect data associated with the corresponding page load.

Figure 4C:
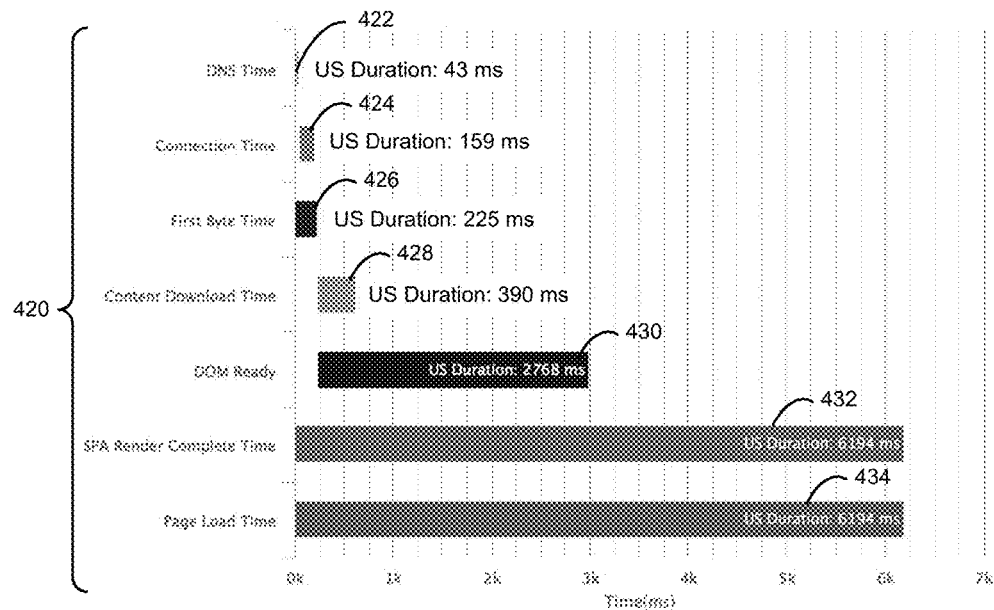
FIG. 4C shows an exemplary screenshot in accordance with the disclosed embodiments.

FIG. 4C shows an exemplary screenshot in accordance with the disclosed embodiments. In particular, FIG. 4C shows a GUI, such as GUI 212 of FIG. 2. The GUI includes a chart 420 of performance data for a SPA. More specifically, chart 420 may be a waterfall chart that shows a number of components 422-434 of an initial page load time of the SPA. In this example screenshot, component 422 represents a DNS time, component 424 represents a connection time, component 426 represents a first byte time, component 428 represents a content download time, component 430 represents a DOM ready time, component 432 represents a render completion time, and component 434 represents the page load time.

Performance metrics associated with components 422-434 may be collected during loading of the SPA and/or calculated from other metrics. For example, metrics associated with components 422-430 may be obtained from a "navigation timing" interface supported by the web browser in which the SPA is loaded. Next, metrics associated with components 432-434 may be calculated from the other metrics and/or from additional values obtained through a RUM API used by the SPA. Values of each metric may then be aggregated into a statistic that is used to produce the corresponding component in chart 420. For example, values of DNS time, connection time, first byte time, content download time, DOM ready time, render completion time, and/or page load time collected from initial page loads over a 24-hour period may be aggregated into $90^{th}$ percentiles, and representations of the percentiles may be shown in components 422-434 within chart 420.

As with charts 402 and 414 of FIGS. 4A-4B, one or more filters (not shown) may be applied to the values to generate different views of chart 420. For example, components 422-434 may be updated to reflect different percentiles, statistics, time periods, pages, views, SPAs, locations, network conditions, and/or other dimensions associated with the performance metrics. In turn, chart 420 may be used to analyze the contribution or timing of components 422-434 of the initial page load time across different dimensions or contexts associated with the SPA.

Figure 4D:
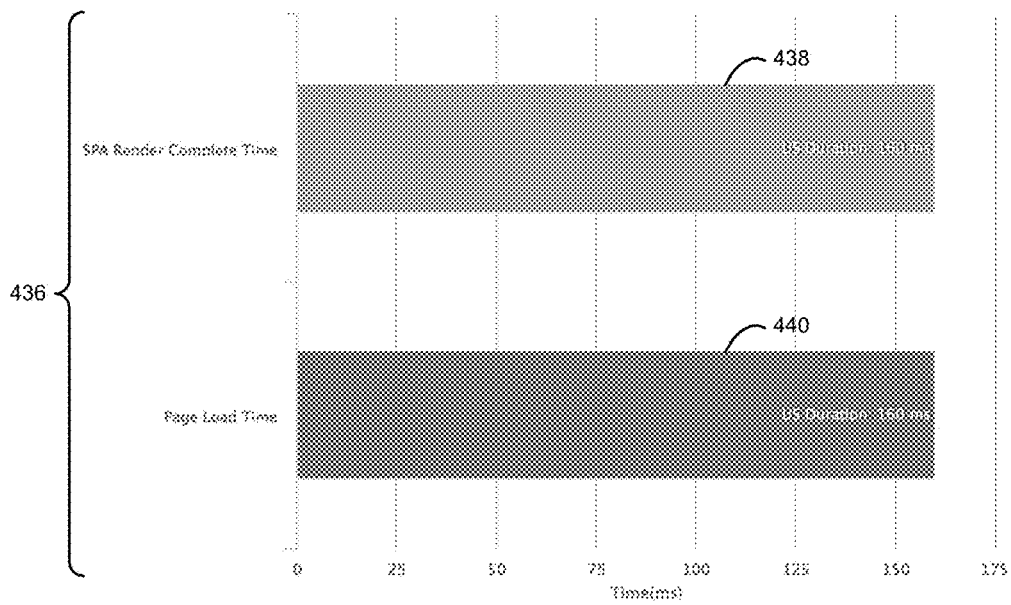
FIG. 4D shows an exemplary screenshot in accordance with the disclosed embodiments.

FIG. 4D shows an exemplary screenshot in accordance with the disclosed embodiments. Like the GUI of FIG. 4C, FIG. 4D shows a screenshot of a GUI containing a waterfall chart 436. Unlike chart 420 of FIG. 4C, chart 436 includes a number of components 438-440 of a subsequent page load time of a subsequent view in the SPA, which is loaded after the initial page load time of the SPA has passed. Component 438 of chart 436 represents a render completion time, and component 440 represents the subsequent page load time. Performance metrics associated with components 438-440 may be collected using calls to a RUM API and/or instrumentation of the SPA instead of using timing information that is based on the loading of HTML. As a result, values of the performance metrics may differ from conventional performance metrics used to calculate page load times of non-SPA websites and web applications.

Like components 422-434 of chart 420, components 438-440 may be updated to reflect different combinations of filters or dimensions associated with the performance metrics. For example, components 438-440 may represent percentiles of render completion times and subsequent page load times of an individual view in the SPA. Alternatively, components 438-440 may represent percentiles of render completion times and subsequent page load times of all subsequent views in the SPA after the SPA is initially loaded in a web browser.

Those skilled in the art will appreciate that the GUIs of FIGS. 4A-4D may include other types and/or representations of information. For example, one or more screens of the GUI may include a table (not shown) containing performance metrics, statistics, dimensions, differences in values, and/or other data associated with the corresponding charts or filters. In a second example, representations of the data in the charts may include additional metrics or dimensions through the use of shading, highlighting, line types, darkness, shape, size, and/or other visual attributes. Axes of the charts may also represent various metrics and/or dimensions associated with the performance metrics or statistics, and the scales of the axes or number of points in the charts may be adjusted to reflect different levels of aggregation, amounts of data, metric or dimensional values, and/or other attributes of the performance metrics or statistics. In a third example, charts in the GUIs may include pie charts, bar charts, histograms, box plots, heat maps, and/or other visualizations of metrics, dimensions, and/or statistics.

Figure 5:
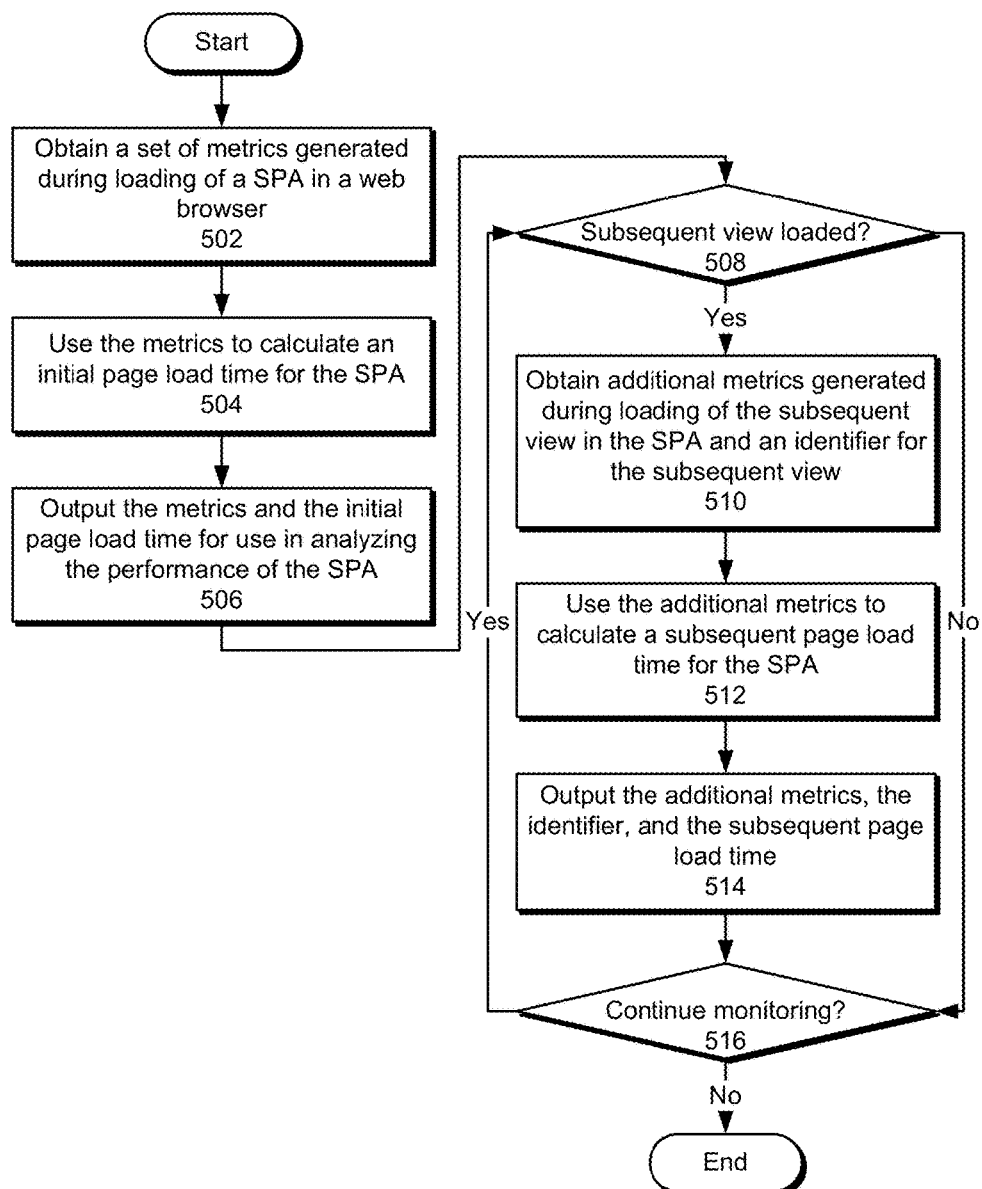
FIG. 5 shows a flowchart illustrating the processing of data in accordance with the disclosed embodiments.

FIG. 5 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, a set of metrics generated during loading of a SPA in a web browser is obtained (operation 502). The metrics may include a page load event, a render completion time, a render start time of a component in the SPA, a render completion time of the component, and/or one or more download times of resources in the SPA. The metrics may be obtained using a navigation timing interface, resource timing interface, RUM API, and/or MVC framework associated with the SPA or web browser.

Next, the metrics are used to calculate an initial page load time for the SPA (operation 504), as described in further detail below with respect to FIG. 6. The metrics and the initial page load time are then outputted for use in analyzing the performance of the SPA (operation 506). For example, the metrics and/or initial page load time may be included in a beacon and/or displayed in a GUI, as described in further detail below with respect to FIG. 7.

A subsequent view may be loaded (operation 508) in the SPA. For example, loading of the subsequent view may be triggered by a click, swipe, button press, keyboard shortcut, scrolling action, and/or other user input or gesture. The loading of the subsequent view may be detected by a call to the RUM API and/or instrumentation of the SPA. If the subsequent view is not loaded, no additional processing is required.

If the subsequent view is loaded, additional metrics generated during loading of the subsequent view and an identifier for the subsequent view are obtained (operation 510), and the additional metrics are used to calculate a subsequent page load time for the SPA (operation 512), as described in further detail below with respect to FIG. 6. The additional metrics, identifier, and subsequent page load time are also outputted (operation 514).

Monitoring of the SPA may continue (operation 516) during execution of the SPA in the web browser. If monitoring is to continue, subsequent page load times may continue to be calculated and outputted for subsequent views loaded in the SPA (operations 508-514). Monitoring may thus continue until the SPA is no longer executed within the web browser.

Figure 6:
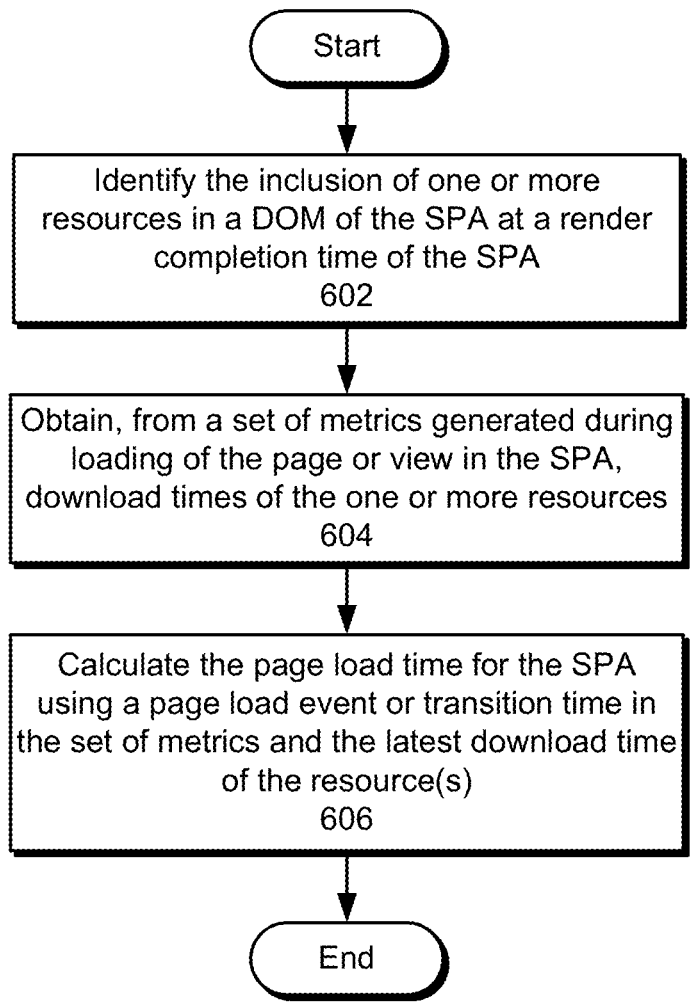
FIG. 6 shows a flowchart illustrating the process of calculating a page load time for a SPA in accordance with the disclosed embodiments.

FIG. 6 shows a flowchart illustrating the process of calculating a page load time for a SPA in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

First, the inclusion of one or more resources in a DOM of the SPA at a render completion time of the SPA is identified (operation 602). For example, the resource(s) may be identified by requesting the resources from a "document" interface supported by the web browser in which the SPA is loaded. The resources may include images, scripts, text, and/or other objects used by the SPA. The resources may also be filtered to remove content that is not visible within the viewport of the SPA and/or resources that were requested after a scroll event or other event associated with loading of a page or view in the SPA.

Next, download times of the resource(s) are obtained from a set of metrics generated during loading of the page or view in the SPA (operation 604). For example, the download times may be obtained from a resource timing API provided by the web browser. The page load time is then calculated using a page load event or transition time in the set of metrics and the latest download time of the resource(s) (operation 606). For example, the page load time may be calculated as an initial page load time of the SPA by subtracting the time of the page load event from the latest download time. Alternatively, the page load time may be calculated as a subsequent page load time of a subsequent view in the SPA by subtracting the transition time from the latest download time.

Figure 7:
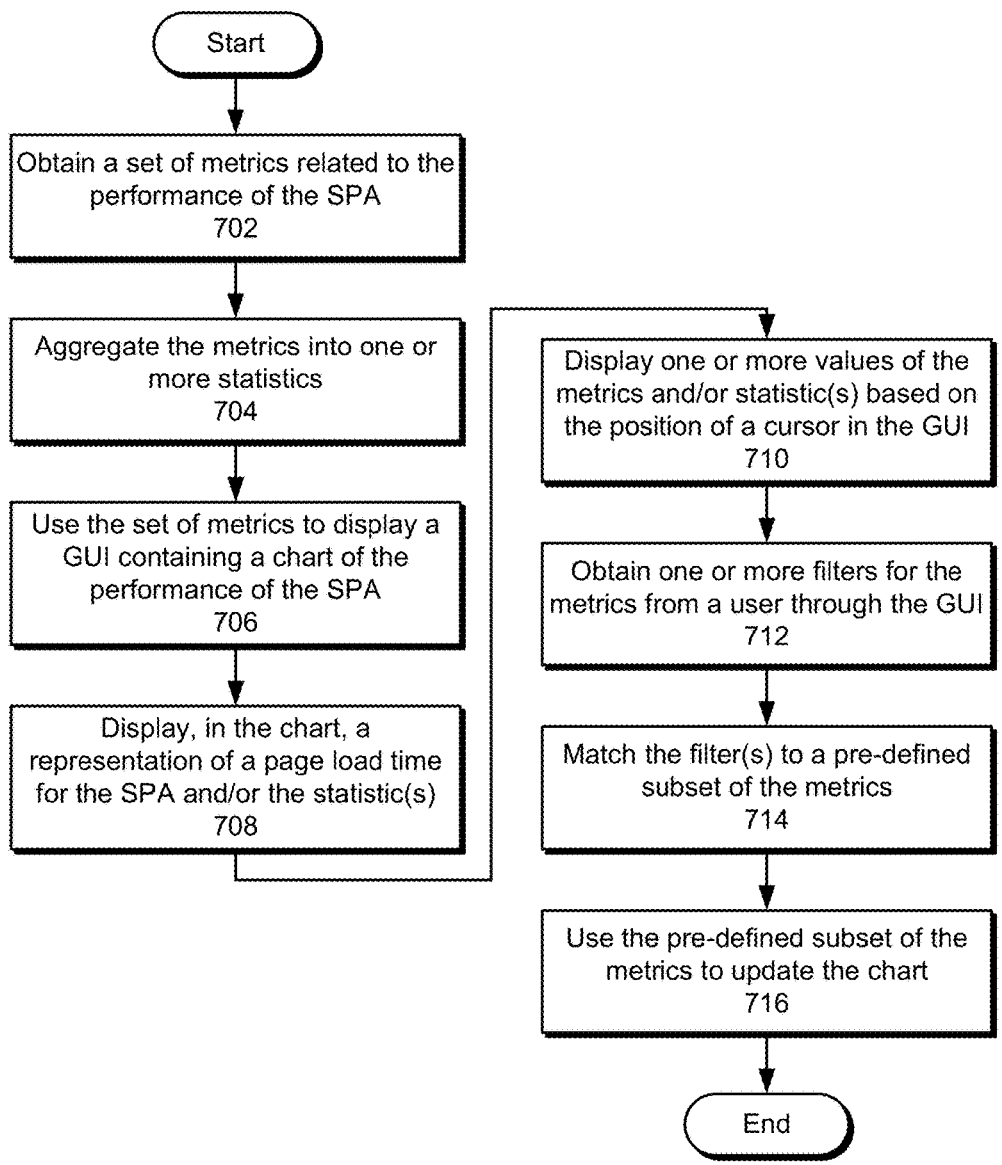
FIG. 7 shows a flowchart illustrating the process of processing a set of metrics related to a performance of a SPA in accordance with the disclosed embodiments.

FIG. 7 shows a flowchart illustrating the process of processing a set of metrics related to a performance of a SPA in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the embodiments.

Initially, a set of metrics related to the performance of the SPA is obtained (operation 702), as described above with respect to FIGS. 5-6. The metrics may include initial page load times and/or subsequent page load times for the SPA. Next, the metrics are aggregated into one or more statistics (operation 704). For example, the metrics may be aggregated into percentiles of the page load times by a number of concurrent tasks. Each task may calculate a statistic for the metrics along one or more dimensions, and then recalculate the statistic along the dimension(s) and one or more additional dimensions. As a result, the tasks may generate the statistics for subsequent querying and/or display in a timely manner.

The set of metrics is also used to display a GUI containing a chart of the performance of the SPA (operation 706). For example, the GUI may include a line chart, waterfall chart, and/or scatter plot. A representation of the page load time and/or other metrics or statistics is also displayed in the chart (operation 708). One or more values of the metrics and/or statistics are further displayed based on the position of a cursor in the GUI (operation 710). For example, a page load time, statistic, and/or one or more dimensions may be displayed next to a graphical representation of the corresponding data point when the cursor is positioned over the graphical representation.

One or more filters for the metrics are obtained from a user through the GUI (operation 712). The filters may include a page, view, location, device, browser, operating system, network, time range, and/or other dimensions associated with the metrics. Next, the filters are matched to a predefined subset of the metrics (operation 714), and the predefined subset of the metrics is used to update the chart (operation 716). For example, different sets of metrics or statistics used to populate the chart and/or other parts of the GUI may be calculated for the most popular or important combinations of filters. A query containing the filters may then be matched to the corresponding set of data, and the data is used to generate various components of the GUI.

Figure 8:
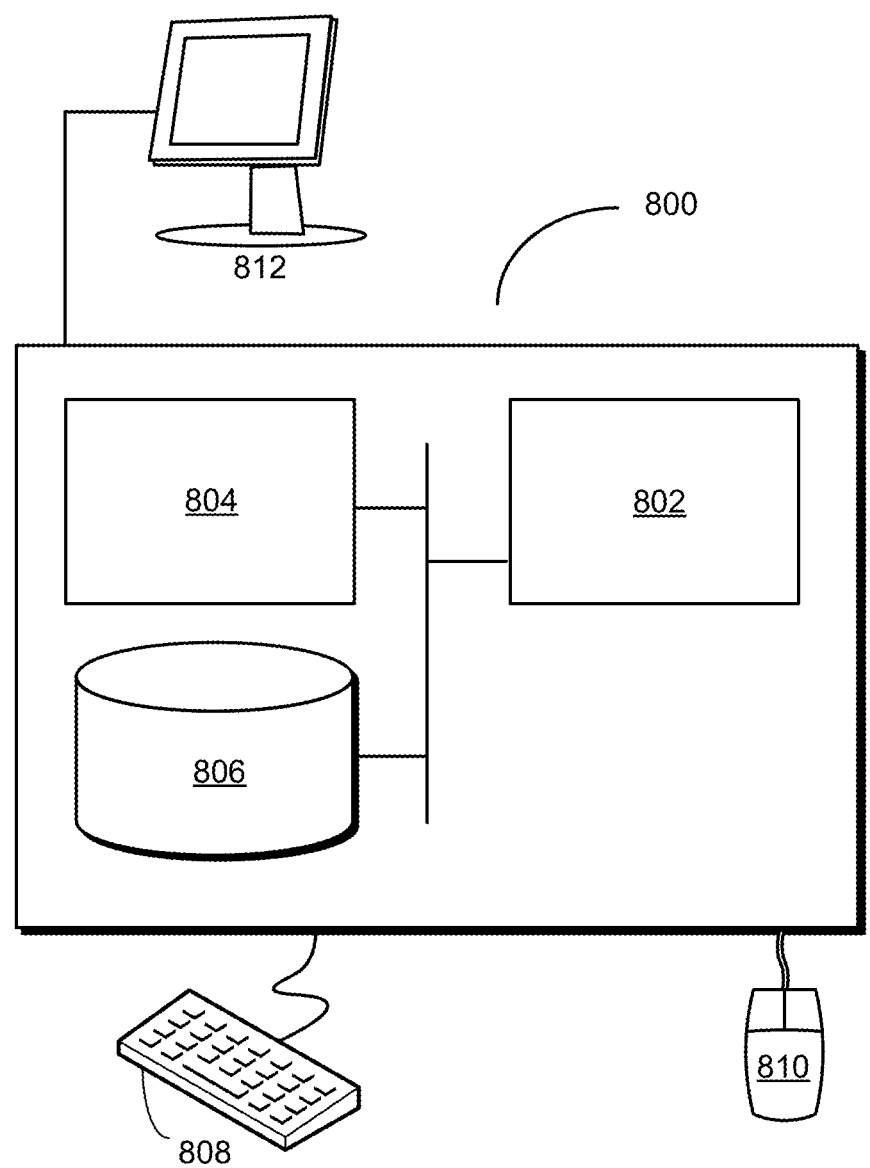
FIG. 8 shows a computer system in accordance with the disclosed embodiments.

FIG. 8 shows a computer system 800 in accordance with an embodiment. Computer system 800 may correspond to an apparatus that includes a processor 802, memory 804, storage 806, and/or other components found in electronic computing devices. Processor 802 may support parallel processing and/or multi-threaded operation with other processors in computer system 800. Computer system 800 may also include input/output (I/O) devices such as a keyboard 808, a mouse 810, and a display 812.

Computer system 800 may include functionality to execute various components of the present embodiments. In particular, computer system 800 may include an operating system (not shown) that coordinates the use of hardware and software resources on computer system 800, as well as one or more applications that perform specialized tasks for the user. To perform tasks for the user, applications may obtain the use of hardware resources on computer system 800 from the operating system, as well as interact with the user through a hardware and/or software framework provided by the operating system.

In one or more embodiments, computer system 800 provides a system for processing data. The system may include an analysis apparatus that obtains a first set of metrics generated during loading of a SPA in a web browser, including a page load event and a render completion time for the SPA. Next, the analysis apparatus may use the first set of metrics to calculate an initial page load time for the SPA. The analysis apparatus may also obtain a second set of metrics generated during loading of a subsequent view in the SPA, including a transition time and the render completion time for the subsequent view. The analysis apparatus may then use the second set of metrics to calculate a subsequent page load time for the SPA.

The system may also include a management apparatus that outputs the metrics and the page load times for use in analyzing a performance of the SPA. For example, the management apparatus may use the metrics to display a GUI containing a chart of the SPA's performance. The management apparatus may also display a representation of the page load times in the SPA.

In addition, one or more components of computer system 800 may be remotely located and connected to the other components over a network. Portions of the present embodiments (e.g., analysis apparatus, management apparatus, data repository, SPA, etc.) may also be located on different nodes of a distributed system that implements the embodiments. For example, the present embodiments may be implemented using a cloud computing system that monitors and manages the performance of a SPA that executes on a set of remote computing devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:
1. A method, comprising:
obtaining a set of metrics related to a performance of a single-page application (SPA), wherein the set of metrics comprises:

an initial page load time of the SPA that is calculated from a page load event and a render completion time, and a subsequent page load time of the SPA that is calculated from a transition time and the render completion time;

aggregating the set of metrics into one or more statistics, wherein the one or more statistics comprise a percentile representation of either the initial page load time or the subsequent page load time, wherein said percentile representation comprises a first value in percentage and a second value with a dimension of time;

using the set of metrics to display, by a computer system, a graphical user interface (GUI) comprising a chart of the performance of the SPA; and displaying, in the chart, a representation of the page load time for the SPA, wherein the representation of the page load time includes a representation of the one or more statistics.

2. The method of claim 1, further comprising:

obtaining one or more filters for the set of metrics from a user through the GUI;

matching the one or more filters to a predefined subset of the metrics; and using the predefined subset of the metrics to update the chart.

3. The method of claim 2, wherein the one or more filters comprise at least one of:
   a page;
   a view;
   a location;
   a device;
   a browser;
   an operating system;
   a network; and
   a time range.

4. The method of claim 1, wherein aggregating the set of metrics into the one or more statistics comprises:

calculating a statistic for the set of metrics along one or more dimensions; and recalculating the statistic along the one or more dimensions and one or more additional dimensions.

5. The method of claim 1, further comprising:

displaying one or more values of the metrics based on a position of a cursor in the GUI.

6. The method of claim 1, wherein the subsequent page load time is calculated by:

obtaining, from the set of metrics, download times of one or more resources associated with loading of the subsequent view; and calculating the subsequent page load time using the transition time and a latest download time of the one or more resources.

7. The method of claim 6, wherein the subsequent page load time is further calculated by:

identifying an inclusion of the one or more resources in a Document Object Model (DOM) of the SPA at the render completion time.

8. The method of claim 1, wherein the chart is at least one of:
   a line chart;
   a scatter plot; and
   a waterfall chart.

9. An apparatus, comprising:
   one or more processors; and
   memory storing instructions that, when executed by the one or more processors, cause the apparatus to:

obtain a set of metrics related to a performance of a single-page application (SPA), wherein the set of metrics comprises:

an initial page load time of the SPA that is calculated from a page load event and a render completion time, and a subsequent page load time of the SPA that is calculated from a transition time and the render completion time;

aggregate the set of metrics into one or more statistics, wherein the one or more statistics comprise a percentile representation of either the initial page load time or the subsequent page load time, wherein said percentile representation comprises a first value in percentage and a second value with a dimension of time;

use the set of metrics to display a graphical user interface (GUI) comprising a chart of a performance of the SPA; and display, in the chart, a representation of the page load time for the SPA, wherein the representation of the page load time includes a representation of the one or more statistics.

10. The apparatus of claim 9, wherein the memory further stores instructions that, when executed by the one or more processors, cause the apparatus to:

obtain one or more filters for the set of metrics from a user through the GUI;

match the one or more filters to a predefined subset of the metrics; and use the predefined subset of the metrics to update the chart.

11. The apparatus of claim 10, wherein the one or more filters comprise at least one of:
   a page;
   a view;
   a location;
   a device;
   a browser;
   an operating system;
   a network; and
   a time range.

12. The apparatus of claim 9, wherein aggregating the set of metrics into the one or more statistics comprises:

calculating a statistic for the set of metrics along one or more dimensions; and recalculating the statistic along the one or more dimensions and one or more additional dimensions.

13. The apparatus of claim 9, wherein the memory further stores instructions that, when executed by the one or more processors, cause the apparatus to:

display one or more values of the metrics based on a position of a cursor in the GUI.

14. The apparatus of claim 9, wherein the chart is at least one of:
   a line chart;
   a scatter plot; and
   a waterfall chart.

15. A system, comprising:
   an analysis module comprising a non-transitory computer-readable medium comprising instructions that, when executed, cause the system to obtain a set of metrics related to a performance of a single-page application (SPA), wherein the set of metrics comprises:

an initial page load time of the SPA that is calculated from a page load event and a render completion time, and a subsequent page load time of the SPA that is calculated from a transition time and the render completion time; and a management module comprising a non-transitory computer-readable medium comprising instructions that, when executed, cause the system to:

aggregate the set of metrics into one or more statistics, wherein the one or more statistics comprise a percentile representation of either the initial page load time or the subsequent page load time, wherein said percentile representation comprises a first value in percentage and a second value with a dimension of time;

use the set of metrics to display a graphical user interface (GUI) comprising a chart of a performance of the SPA; and display, in the chart, a representation of the page load time for the SPA, wherein the representation of the page load time includes a representation of the one or more statistics.

16. The system of claim 15, wherein the non-transitory computer-readable medium of the management module further comprises instructions that, when executed, cause the system to:

obtain one or more filters for the set of metrics from a user through the GUI;

match the one or more filters to a predefined subset of the metrics; and use the predefined subset of the metrics to update the chart.

* * * * *